H. DE OLANETA.
MACHINE FOR ASSEMBLING DRY CELLS.
APPLICATION FILED MAY 19, 1920.
1,430,728.
Patented Oct. 3, 1922.
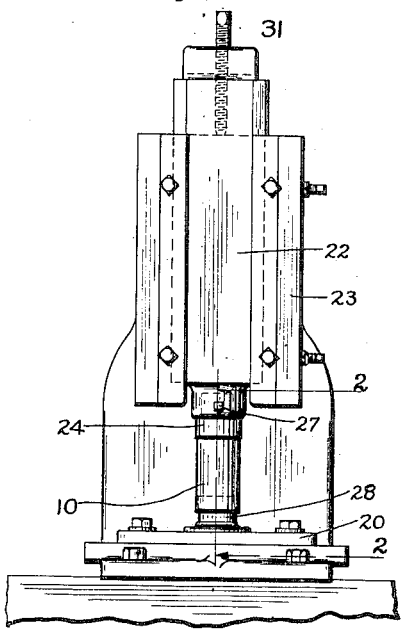
Fig. 1.
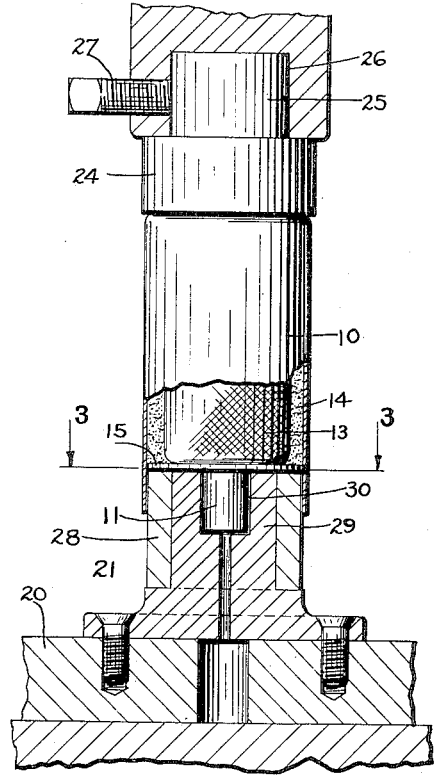
Fig. 2.
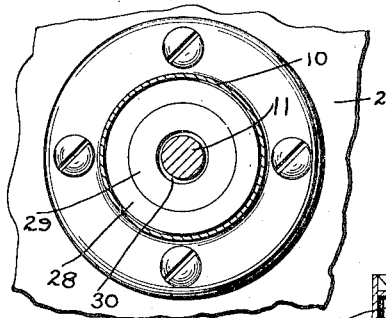
Fig. 3.
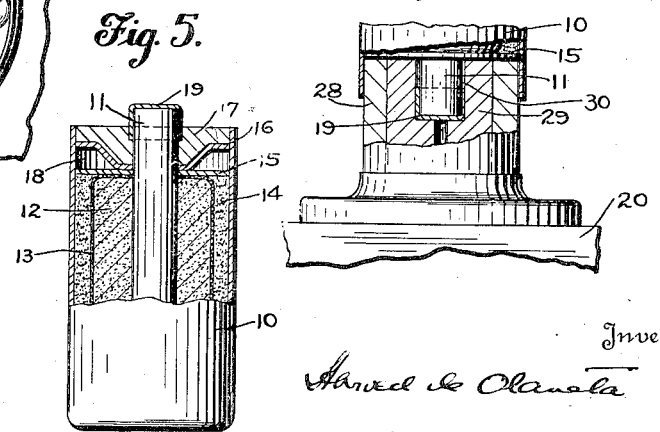
Fig. 4.
Fig. 5.
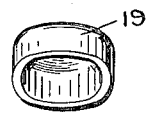
Fig. 6.
Inventor
Manuel de Olaneta
By
Attorney Patented Oct. 3, 1922.

1,430,728

UNITED STATES PATENT OFFICE.

HAROLD DE OLANETA, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

MACHINE FOR ASSEMBLING DRY CELLS.

Application filed May 19, 1920. Serial No. 382,471.

*To all whom it may concern:*

Be it known that I, HAROLD DE OLANETA, a citizen of the United States residing in New Haven, New Haven County, Connecticut, have invented certain new and useful Improvements in Machines for Assembling Dry Cells, of which the following is a full, clear, and exact description.

This invention relates to dry cells, and is particularly applicable to dry cells of the pocket or miniature type, such as commonly employed in connection with pocket flashlights, although the invention is not necessarily limited in this respect.

The present application is a continuation in part of my application, Serial No. 379,514, and pertains more especially to a machine for assembling a dry cell having a zinc cup, a carbon electrode carrying a cartridge or body of depolarizing material, a paste interposed between the side surface of the cartridge and the side wall of the cup, and a suitable top closure for the cup.

More specifically the invention pertains to a machine for assembling a cell of the character indicated, where one or more thin, flexible, insulating washers surround the carbon electrode near its upper end and are surmounted by a pitch seal.

One of the primary objects of the invention is to provide a simple and efficient machine for assembling certain parts of the cell.

Another object of the invention is to furnish an improved apparatus for squeezing the cartridge into the paste so that the latter will be disposed in a uniform layer about the cartridge.

To these and other ends the invention consists in the novel features and combinations of parts to be hereinafter described and claimed.

In the accompanying drawing:

Fig. 1 is a front elevation of the main parts of a machine embodying my invention;

Fig. 2 is an enlarged section on line 2—2 of Fig. 1;

Fig. 3 is a section on line 3—3 of Fig. 2;

Fig. 4 is a detail, showing how the machine is operated in capping the carbon electrode;

Fig. 5 is a detail of the completed dry cell; and

Fig. 6 is a detail of the cap for the carbon electrode.

In Fig. 5 of the drawing, I have shown one form of dry cell, in the assemblage of which my new machine may be used to advantage. The zinc cup 10, constituting one electrode, contains a carbon pencil 11, which serves as the other electrode, and the electrode 11 carries a depolarizing cartridge 12 contained within a porous envelope such as a bag 13 of cheese cloth, or the like. Between the side surface of the cartridge and the inner surface of the side wall of the zinc cup is a suitable paste 14. In the bottom of the zinc cup is a centering disk for the cartridge, which centering disk is not shown herein, but is fully illustrated in the method application, Serial No. 379,514. Overlying the cartridge 12 and abutting the upper surface thereof is a flexible washer 15 of paraffined paper, or the like, having an opening whereby it is fitted about the carbon electrode. Above the washer 15 is a washer 16, which may likewise be of paraffined paper, and which is of cupped form, having a downwardly bulged central portion providing a deep pocket near the center of the cell for the sealing material 17. The bulged portion of the upper washer also provides a peripheral chamber 18 for the accommodation of gas. The top of the carbon electrode 11 is provided with a contact cap 19, usually of brass.

The paste 14 is usually fairly stiff. In practice, it will contain, for example, a certain amount of wheat flour, or other cereal, and a chlorid solution; and by preference also, it contains a certain quantity of an amalgamating compound such as mercuric chlorid, for example. Preferably the paste is cooked before being used, the flour, chlorid solution, and mercury compound being all mixed together with water and heated while the mass is being stirred.

In assembling the cell, a measured quantity of paste is first placed in the bottom of the cup 10, so as to fill the same up to a certain level. The carbon electrode 11, carrying the cartridge 12, has the bottom centering disk applied to the lower end of the same, as described in the companion application, Serial No. 379,514, and the two elements, that is to say, the cartridge and the bottom centering disk, are then dropped into the zinc cup so as to rest on top of the paste.

The thin paper washer 15 is then placed on the upper end of the projecting carbon pencil, which extends through the central opening in the washer. The cartridge is next forced into the paste to such an extent that the paper washer 15 enters the mouth of the zinc cup to a certain extent, and in this operation the paste in the bottom of the cup will be somewhat displaced, causing a portion of the same to flow along the side of the cartridge.

The partly assembled cell is then inverted and placed in a press, such as shown in Fig. 1. This press is provided with a die bed 20, having a pedestal 21 of cylindrical shape adapted to position the cartridge. The press is also provided with a head or gate 22, adapted to be moved up and down in a suitable guide 23. The gate of the press carries at its lower part a plunger 24, which is preferably made of hard rubber or other insulating material. This plunger is preferably in the form of a cylindrical block, having a stem 25 fitting within a socket 26 in the lower end of the press gate and detachably held in place by a set screw 27 passing through the wall of the socket 26.

The diameter of the upper cylindrical part of the pedestal 21 is approximately equal to the inner diameter of the zinc cup, so that it will fit nicely within said cup. Preferably the outer portion of the pedestal is constituted by a sleeve 28 of hard rubber, or similar insulating material. The inner part of the pedestal is constituted by a steel core 29. This core has a central cylindrical recess 30, adapted to receive the projecting end of the carbon pencil with a certain amount of clearance.

For assembling the cell parts, the partially assembled cell is placed over the pedestal 21, the upper end of the pedestal entering the mouth of the zinc cup to a slight extent only. The upper surface of the pedestal is in contact with the lower face of the paper washer 15 and supports said washer. The plunger 24 is then caused to descend and to make contact with the bottom of the inverted zinc cup, which is thereby moved downward to a position such as that shown in Fig. 2. The downward movement of the plunger causes the paste to be flowed downwardly into the space at the side of the cartridge; and the arrangement is such that the downward movement of the plunger 24 is arrested by a suitable device 31 at a point where the paste is fully squeezed out of the upper part of the cup into the space at the side of the cartridge. The quantity of paste initially introduced into the cup is such that when the top (bottom) of the inverted zinc cup is brought down as far as possible, relatively to the cartridge, the side space within the zinc cup will be neatly filled by the paste without overflowing. In the operation of assembling, the lowermost portion of the paste strikes the upper surface of the paper washer 15, which serves as a stop for the paste and causes the same to be distributed laterally until, at the completion of the relative approaching movement between the members 24 and 21, the side surface of the cartridge is covered by a uniform layer of paste.

As the plunger 24 is moved downwardly for the flowing of the paste into place, the inner surface of the mouth portion of the cup slides over the cylindrical surface of the hard rubber member 28 of the pedestal. In this operation the lower end of the carbon pencil does not make contact with the pedestal, as the recess 30 affords clearance in all directions. In this manner liability of breaking or chipping the protruding end of the pencil is overcome. When the paste has been flowed into place the cell can be readily slipped off of the pedestal after the plunger has been raised.

It will be obvious that the members 24 and 28 are made of insulating material for the purpose of preventing short circuiting of the cell during assemblage.

The machine herein described may also be used for capping the carbon pencil. This can be done either simultaneously with the flowing of the paste into place or by a later operation. If it is desired to perform the two operations simultaneously, the inverted brass cap 19 is dropped into the recess 30 at the upper end of the pedestal before the zinc cup, with the cartridge therein, is slipped over the top of the pedestal. The arrangement in this case is such that at the end of the paste flowing movement, the terminal of the carbon pencil will be forced into the cupped contact cap so as to have snug engagement therewith. In case these operations are performed simultaneously, the brass contact cap will preferably be of quite thin metal, as otherwise the pressure required for sealing the contact cap on the pencil may have an injurious effect upon the cartridge.

Where the paste flowing and pencil capping operations are not carried out simultaneously, the latter is performed after the paste flowing operation has taken place and subsequent to the removal of the zinc cup from the pedestal. After such removal, the contact cap is dropped into the recess or socket 30 and then by a subsequent operation of the press the partly assembled cell is pressed downwardly by the plunger 24 to force the protruding end of the pencil into tight engagement with the inner surface of the contact cap. It has been my experience that where these operations are performed in the sequence just stated, the metal used for the contact cap may be of thicker gage and somwhat less care is required in capping the pencil, although with a machine such as described, it is perfectly feasible to cap the pencil at the same time that the paste is flowed into place, that is to say, on the same downward movement of the press plunger.

After the placing of the contact cap, the washer 16 and the sealing material 17 are used for permanently closing the upper end of the cell.

Various changes may be made in the procedure, as herein described, and in the details of the apparatus, without departing from the scope of my invention, as defined in the claims.

It will be obvious that in the broader aspects of the invention, the pedestal herein illustrated constitutes an abutment member for positioning an inverted cartridge, and more specifically, a cartridge having a downwardly protruding pencil, there being preferably clearance for the pencil, to prevent the breakage thereof, while the plunger serves as a movable member for exerting pressure on the cup of the dry cell. In some aspects, the invention is not limited to a machine or apparatus in which the cartridge positioning means is stationary, while the means for exerting pressure on the cup is movable, as in some cases it is merely necessary that the two members of the machine have movement relatively to each other I do not claim herein the method of assembling the parts of the cell, as claimed in my application Serial No. 379,514, nor do I claim herein the cell per se, which is claimed in my application Serial No. 368,324 and other applications filed by me.

What I claim is:

1. A machine for assembling dry cells, including in its construction, means for positioning an inverted cartridge, and cup positioning means, said two means being relatively movable.

2. A machine for assembling dry cells, including in its construction, an abutment member for positioning a cartridge having a protruding pencil, and a member for exerting pressure on the cup of the cell, said two members being relatively movable.

3. In a machine such as described, a stationary member for positioning an inverted cartridge and a movable member for forcing the cup over the cartridge.

4. In a machine such as described, a stationary member constituting an abutment for supporting a cartridge having a protruding pencil, and a movable pressure member co-operating therewith.

5. In a machine such as described, a cartridge positioning member adapted to serve as an abutment for a cartridge having a pencil protruding toward said member, and a pressure member for co-operation with the cup in positioning the cartridge within the cup.

6. In a machine such as described, a stationary cartridge abutment member, against which the cartridge is positioned with its protruding pencil directed toward said member, and a co-operating movable member for exerting pressure on the dry cell cup.

7. In a machine such as described, a cartridge abutment having a pencil recess.

8. In a machine such as described, a cartridge abutment member having a pencil recess, and a member for exerting pressure on the dry cell cup.

9. In a machine such as described, means for positioning an inverted cartridge with a downwardly protruding pencil, and means co-operating therewith for exerting pressure on the cup.

10. In a machine such as described, means for positioning an inverted cartridge having a downwardly protruding pencil, comprising a stationary abutment having a pencil recess in its upper surface, and a vertically movable plunger co-operating with said abutment.

11. In a machine such as described, means for positioning an inverted cartridge having a downwardly protruding pencil, comprising a stationary abutment having a pencil recess in its upper surface, said pencil recess being of sufficient size to clear the pencil and thus prevent breakage thereof, and a movable pressure member co-operating with said abutment.

12. In a machine such as described, an abutment to position a cartridge with a protruding pencil, having a pencil recess, with clearance at the side and end of the pencil to prevent breakage of the latter, and a member for exerting pressure on the dry cell cup.

13. In a machine such as described, an abutment to position a cartridge with a protruding pencil, having a pencil recess, with clearance at the side and end of the pencil to prevent breakage of the latter, and a member for exerting pressure on the dry cell cup, said abutment, where it makes contact with the dry cell cup, being constructed of insulating material.

14. In a machine such as described, a cartridge pedestal.

15. In a machine such as described, a cartridge supporting pedestal having a pencil recess.

16. In a machine such as described, a cartridge supporting pedestal having a pencil recess, the outer portion of the pedestal being constructed of insulating material.

17. In a machine such as described, a cartridge supporting pedestal having a pencil recess, the outer portion of the pedestal being constructed of insulating material, and a plunger of insulating material co-operating with said pedestal.

18. The method of making a dry cell, which comprises squeezing the cartridge into the paste and capping the carbon pencil, substantially simultaneously.

19. The method of assembling the main parts of a dry cell and simultaneously capping the carbon pencil projecting from the dry cell cartridge, which comprises positioning the inverted cartridge against an abutment having a carbon pencil recess holding a contact cap for the pencil, placing a paste-containing cup over the cartridge, and then subjecting the parts to pressure.

20. The method of capping the carbon pencil of a dry cell, which consists in forcing the pencil down into a socket containing an inverted cap.

21. The method of capping the carbon pencil of a dry cell, which consists in positioning the cell against an abutment having a pencil recess therein, with a contact cap in the recess, and then exerting pressure on the containing cup of the cell in order to press the pencil into the contact cap.

22. A machine for assembling dry cell parts, comprising a cartridge pedestal and a cup pressing plunger.

23. A machine for assembling dry cell parts, comprising a pedestal for positioning an inverted cartridge and a plunger for forcing the cup downwardly over the cartridge.

In witness whereof, I have hereunto set my hand on the 17th day of May, 1920.

HAROLD DE OLAÑETA.